US012695229B2

(12) United States Patent
Funke et al.

(10) Patent No.: US 12,695,229 B2
(45) Date of Patent: Jul. 28, 2026

(54) SILVER-TIN COATING FOR ELECTRICAL CONNECTORS, AND ELECTRICAL CONNECTORS WITH SILIVER-TIN COATINGS

(71) Applicant: Wieland Rolled Products North America, LLC, Louisville, KY (US)

(72) Inventors: Kelly S. Funke, Godfrey, IL (US); Kon John, Crestwood, KY (US)

(73) Assignee: WIELAND ROLLED PRODUCTS NORTH AMERICA, LLC, Louisville, KY (US)

( * ) Notice: Subject to any disclaimer, the term of this patent is extended or adjusted under 35 U.S.C. 154(b) by 0 days.

(21) Appl. No.: 18/714,252

(22) PCT Filed: Dec. 2, 2022

(86) PCT No.: PCT/US2022/051654
§ 371 (c)(1),
(2) Date: May 29, 2024

(87) PCT Pub. No.: WO2023/102181
PCT Pub. Date: Jun. 8, 2023

(65) Prior Publication Data
US 2025/0038443 A1     Jan. 30, 2025

Related U.S. Application Data

(60) Provisional application No. 63/285,255, filed on Dec. 2, 2021.

(51) Int. Cl.
*H01R 13/03*     (2006.01)
*B32B 15/01*     (2006.01)
(Continued)

(52) U.S. Cl.
CPC ........... *H01R 13/03* (2013.01); *B32B 15/018* (2013.01); *C22C 5/06* (2013.01); *C22C 9/02* (2013.01); *C22C 13/00* (2013.01); *H01R 43/16* (2013.01)

(58) Field of Classification Search
None
See application file for complete search history.

(56) References Cited

U.S. PATENT DOCUMENTS

| | | | |
|---|---|---|---|
| 7,189,630 B2 | 3/2007 | Buresch | |
| 2005/0106408 A1 | 5/2005 | Chen et al. | |

(Continued)

FOREIGN PATENT DOCUMENTS

| | | |
|---|---|---|
| EP | 2195885 B1 | 6/2010 |
| EP | 2868772 A1 | 5/2015 |

(Continued)

OTHER PUBLICATIONS

International Search Report issued in corresponding International Application No. PCT/US2022/051654, date of mailing Apr. 7, 2023 (2 pages).

(Continued)

*Primary Examiner* — Seth Dumbris
(74) *Attorney, Agent, or Firm* — FLYNN THIEL, P.C.

(57) ABSTRACT

A copper alloy electrical connector component has a coating thereon formed by applying a nickel layer of between about 5 μin and about 20 μin over the copper alloy; applying a copper layer of between about 7 μin and about 18 μin over the nickel layer; applying a total of between about 5 μin and about 15 μin silver layers and about 40 μin and about 80 μin of tin layers over the copper layer: and heating to the coated copper alloy electrical connector component to cause mixing of the silver and tin layers and formation of at least 8 vol % of an Ag3Sn intermetallic.

23 Claims, 16 Drawing Sheets

(51) Int. Cl.

| | |
|---|---|
| *C22C 5/06* | (2006.01) |
| *C22C 9/02* | (2006.01) |
| *C22C 13/00* | (2006.01) |
| *H01R 43/16* | (2006.01) |

(56) References Cited

U.S. PATENT DOCUMENTS

| | | | |
|---|---|---|---|
| 2006/0216475 A1 | 9/2006 | Miyazawa et al. | |
| 2015/0213918 A1 | 7/2015 | Shibuya et al. | |
| 2018/0212350 A1* | 7/2018 | Tamura | C25D 7/00 |
| 2019/0214758 A1* | 7/2019 | Kato | H01R 13/11 |

FOREIGN PATENT DOCUMENTS

| | | | | |
|---|---|---|---|---|
| JP | 11350189 A | 12/1999 | | |
| JP | 2005199699 A | 7/2005 | | |
| WO | WO-2009020180 A1 * | 2/2009 | | C23C 28/021 |

OTHER PUBLICATIONS

Written Opinion of International Searching Authority, issued in corresponding International Application No. PCT/US2022/051654, date of mailing Apr. 7, 2023 (9 pages).

Yu-Jae Jeon et al., Growth of an Ag3Sn Intermetallic Compound Layer Within Photovoltaic Module Ribbon Solder Joints, International Journal of Precision Engineering and Manufacturing-Green Technology, vol. 7, 2019 (8 pages).

P.J. Rossi et al., Dependence of intermetallic compound formation on the sublayer stacking sequence in Ag—Sn bilayer thin films, Acta Materialia, vol. 103, pp. 174-183, 2016 (10 pages).

European Search Report issued in corresponding European Application No. 22902226.4 dated Oct. 9, 2025 (42 pages).

Notice of Reasons for Refusal issued in corresponding Japanese Application No. 2024-532819 dated Dec. 3, 2025 (8 pages).

* cited by examiner image_210118_011 - PPI B side A 100x obj image_210118_009 - PPI B side B 100x obj image_210119_007 - PPI D side A 100x obj image_210119_005 - PPI D side B 100x obj image_210118_003 - PPI A side A 100x obj image_210118_001 - PPI A side B 100x obj image_210119_003 - PPI C side A 100x obj image_210119_001 - PPI C side B 100x obj C:\EDS\USR\210804a Bluish gray phase in PPI B RoverN sample\1b.spc Label A: 1b

| C:\EDS\USR\210804a Bluish gray phase | | | | | |
|---|---|---|---|---|---|
| Acquisitic | Date: 4-Aug-2021 | | | | |
| KV:10.00 | Tilt: 0.00 | Take off: | AmpT:102.4 | | |
| Detector | Resolutio | Lsec:50 | | | |
| EDAX ZAF | Standard | | | | |
| Element Normalized | | | | | |
| SEC Table : Default | | | | | |
| Element | Wt% | At% | K-Ratio | Z | A | F |
| AgL | 71.5 | 73.4 | 0.7248 | 1.0117 | 0.9956 | 1.0065 |
| SnL | 28.5 | 26.6 | 0.259 | 0.9698 | 0.9369 | 1 |
| Total | 100 | 100 | | | |
| Element | Net Inte. | Bkgd Inte | Inte. Erro | P/B | |
| AgL | 222.1 | 16.26 | 1.02 | 13.66 | |
| SnL | 59.86 | 13.94 | 2.21 | 4.29 | | image_210119_027 - PPI I side A 100x obj image_210119_025 - PPI I side B 100x obj image_210119_031 - PPI J side A 100x obj image_210119_029 - PPI J side B 100x obj

SILVER-TIN COATING FOR ELECTRICAL CONNECTORS, AND ELECTRICAL CONNECTORS WITH SILIVER-TIN COATINGS

CROSS-REFERENCE TO RELATED APPLICATION

This claims the benefit of U.S. Provisional Application No. 63/285,255, filed Dec. 2, 2021.

FIELD

This disclosure relates to coatings for electrical connectors, and to coated electrical connectors.

BACKGROUND

This section provides background information related to the present disclosure which is not necessarily prior art.

Tin coatings have been used for years by terminal and connector manufacturers to provide a stable, separable contact interface over the life of the connector. Tin plating is relatively soft and allows for a mating contact to break through the thin surface oxides that may form, at reasonably low loads, providing a good electrical path between the mating parts. Thinner tin coatings are generally more desirable because they generally provide lower resistance to normal forces and a reduced coefficient of friction. However, the thickness of the tin layers must be sufficient so that the formation of tin-copper intermetallics does not "use up" the available free tin and change the physical properties of the connector. Various barrier layers, for example Ni layers and Ni and Cu layers, have been introduced to reduce the formation of tin-copper intermetallics and allow for thinner tin layers, to reduce friction. Efforts continue to improve tin coatings and reduce friction.

SUMMARY

This section provides a general summary of the disclosure and is not a comprehensive disclosure of its full scope or all of its features.

Embodiments of the present disclosure provides improved tin coatings for electrical connectors. In particular, embodiments of the present disclosure provide for applying a layer of silver below the layer of tin. The inventors have observed that the friction force of tin coated electrical connectors is reduced by the presence of tin-silver intermetallics in the tin layer, and in particular by the volume fraction of $Ag_3Sn$ intermetallics in the tin layer.

In one embodiment the disclosure provides a coating over a copper alloy electrical connector component. The coating can be formed by applying a nickel layer of between about 5 $\mu$in and about 20 $\mu$in over the copper alloy of the electrical connector component, and then applying a copper layer of between about 7 $\mu$in and about 18 $\mu$in over the nickel layer. This provides a barrier to diffusion, reducing the formation of tin-copper intermetallics that might otherwise consume the available tin in the tin layer. Eventually the copper in the barrier layer will form tin-copper intermetallics with the tin, and the nickel layer and the tin-copper intermetallic layer will slow further loss of tin to the formation of intermetallics with the copper from the connector component. Layers of silver and tin are applied over the copper layer and are subjected to a reflow process and the formation of a silver-tin layer containing $Ag_3Sn$ intermetallic.

In general, between about 5 $\mu$in and about 15 $\mu$in silver, and between about 40 $\mu$in and about 80 $\mu$in of tin are applied. This can be in a single layer of silver over the copper layer and a single layer of tin over the silver layer. Alternatively, this can be multiple layers of silver and tin interleaved over the copper layer. The coated copper alloy electrical connector component is heated to cause mixing of the silver and tin layers and formation of at least 8 vol % of an $Ag_3Sn$ intermetallic, and preferably between 8 vol % and about 40 vol %.

In another embodiment the disclosure provides a method of providing a coating on a copper alloy electrical connector component. The method applying a nickel layer of between about 5 $\mu$in and about 20 $\mu$in over the copper alloy and applying a copper layer of between about 7 $\mu$in and about 18 $\mu$in over the nickel layer. One or more layers of silver and of tin are then applied over the copper layer and subjected to a reflow process and the formation of a silver tin layer containing $Ag_3Sn$ intermetallic.

In general, between about 5 $\mu$in and about 15 $\mu$in silver, and between about 40 $\mu$in and about 80 $\mu$in of tin are applied. This can be in a single layer of silver over the copper layer and a single layer of tin over the silver layer. Alternatively, this can be multiple layers of silver and tin interleaved over the copper layer. The coated copper alloy electrical connector component is heated to cause mixing of the silver and tin layers and formation of at least 8 vol % of an $Ag_3Sn$ intermetallic, and preferably between 8 vol % and about 40 vol %.

In another embodiment, the disclosure provides a copper alloy electrical connector component with a coating. The coating is formed by applying a nickel layer of between about 5 $\mu$in and about 20 $\mu$in over the copper alloy of the electrical connector component, and then applying a copper layer of between about 7 $\mu$in and about 18 $\mu$in over the nickel layer. This provides a barrier to diffusion, reducing the formation of tin-copper intermetallics that might otherwise consume the available tin in the tin layer. Eventually the copper in the barrier layer will form tin-copper intermetallics with the tin, and the nickel layer and the tin-copper intermetallic layer will slow further loss of tin to the formation of intermetallics with the copper from the connector component. Layers of silver and tin are applied over the copper layer and are subjected to a reflow process and the formation of a silver tin layer containing $Ag_3Sn$ intermetallic.

In general, between about 5 $\mu$in and about 15 $\mu$in silver, and between about 40 $\mu$in and about 80 $\mu$in of tin are applied. This can be in a single layer of silver over the copper layer and a single layer of tin over the silver layer. Alternatively, this can be multiple layers of silver and tin interleaved over the copper layer. The coated copper alloy electrical connector component is heated to cause mixing of the silver and tin layers and formation of at least 8 vol % of an $Ag_3Sn$ intermetallic.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 16:
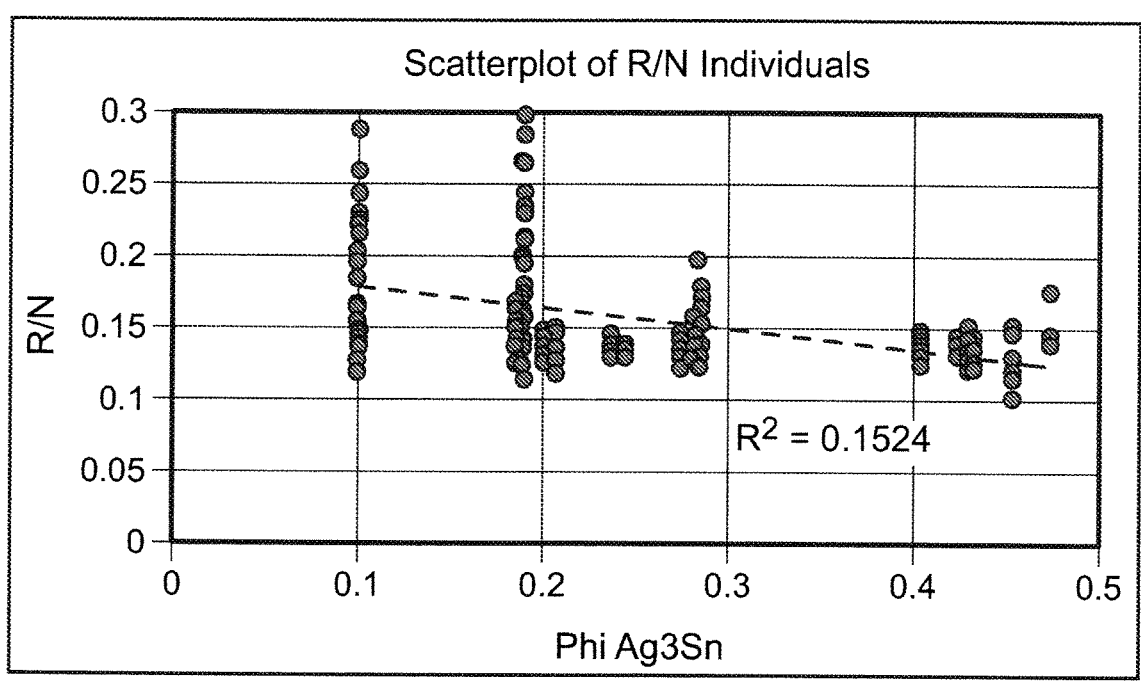
Figure 17:
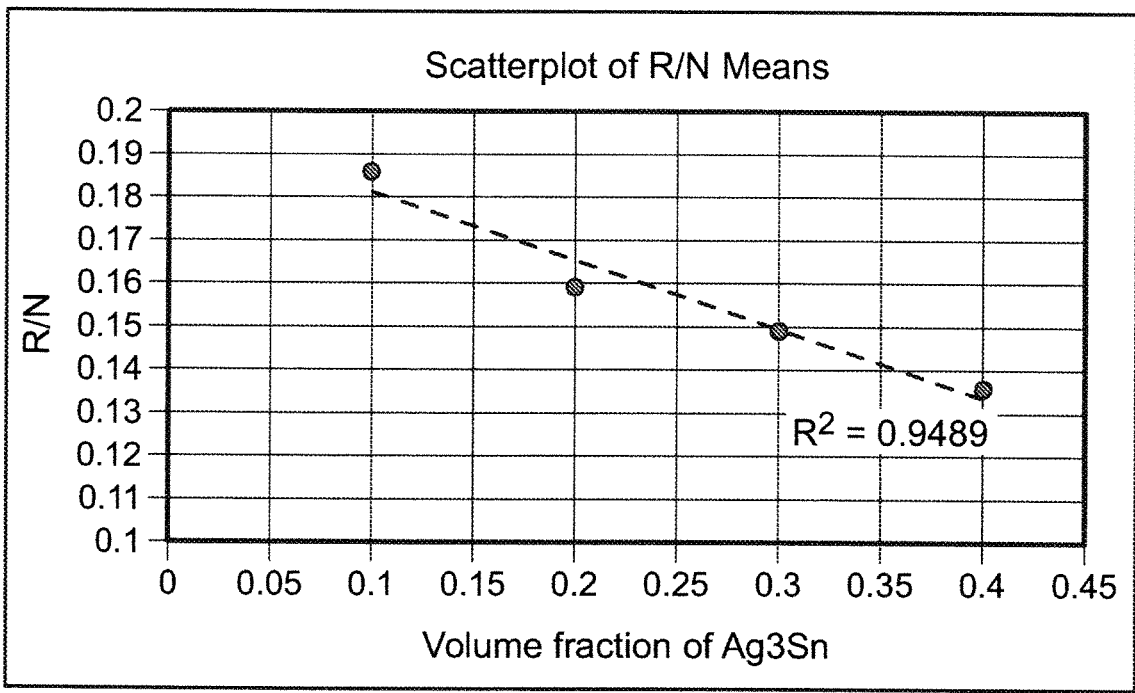

FIG. 16 is a scatterplot of individual R/N points versus volume fraction of $Ag_3Sn$ intermetallic in the surface coating, showing that the R/N gets smaller with increasing volume fraction of $Ag_3Sn$ intermetallic in the surface coating, and the variance also gets smaller with increasing volume fraction of $Ag_3Sn$; and FIG. 17 is a scatterplot of mean R/N versus volume fraction of $Ag_3Sn$ intermetallic in the surface coating, showing that the mean R/N gets smaller with increasing volume fraction of $Ag_3Sn$ intermetallic in the surface coating.

Corresponding reference numerals indicate corresponding parts throughout the several views of the drawings.

DETAILED DESCRIPTION

Example embodiments will now be described more fully with reference to the accompanying drawings.

Tin coatings were formed on a copper alloy substrate with nickel copper barrier layer, and a silver layer between the barrier layer and the tin layer, with two different thicknesses for the tin layer and two different thicknesses for the silver layer. The samples were subject to a reflow process, and the friction (R/N) measured on each side of the substrate and averaged. These results as shown in Table 1:

TABLE 1

| R/N of Sn Reflowed Ag/ATB Samples PPI A through D | | | | | |
| --- | --- | --- | --- | --- | --- |
| | Layer Thickness (uin) | | R/N | | |
| Sample | Ag | Sn | Side A | Side B | Sample Avg. |
| PPI B | 15 | 37 | 0.1378 | 0.1352 | 0.1365 |
| PPI D | 15 | 75 | 0.1561 | 0.1497 | 0.1529 |
| PPI A | 5 | 37 | 0.1476 | 0.1790 | 0.1632 |
| PPI C | 5 | 75 | 0.1808 | 0.1758 | 0.1783 |

The coefficient of friction for the values reported through this disclosure were determined using a linear reciprocating rider on flat method typical in the industry for evaluating electrical connector materials. The test was done by sliding a ⅛" diameter hemispherical rider of the material over a flat of the material under a load of 2.5 N (250 gf) under dry conditions over a length of 3 mm at a speed of 3 mm/s for 10 cycles; one cycle was 3 mm forward and 3 mm backward. The constant speed portion of each cycle was 60% of the cycle; the duration of each test was 25 seconds.

The R/N value measured from this test represented the coefficient of sliding friction, where R was the measured traction force and N was the applied normal force. The R/N value that was deemed the final result of each test was calculated as the average R/N for the ten forward and ten backward movements; the R/N for each movement was taken as the portion of the movement which had the highest average R/N over a span of five consecutive data points, which represented approximately 0.5 mm of travel in the movement.

The coefficient of friction was generally lower for thicker Ag underplated samples PPI B and PPI D. As can be seen in Table 1, the lowest sample average R/N (PPI B) had a combination of thick Ag and thin Sn (15/37), and the highest sample average R/N (PPI C) had a combination of thin Ag and thick Sn (5/75).

FIGS. 1 through 4 show optical micrographs of the as-is reflowed surface of samples A through D, presented in the same order as Table 1, i.e., ascending order of R/N. These micrographs show a bluish gray second phase in the reflowed surface, the volume fraction of which visibly decreases from FIGS. 1 through 4. As can be seen from these figures, the increasing R/N is associated with a decreasing amount of second phase.

Figure 1:
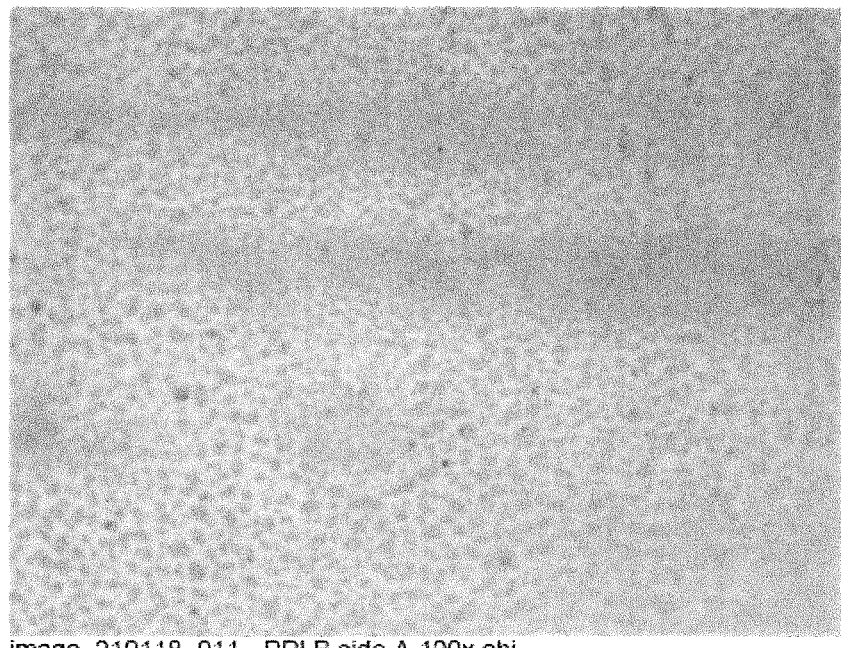
FIG. 1 are photomicrographs of the as reflowed surface of sample PPI B, sides A and B, at 100× magnification.
Figure 1:
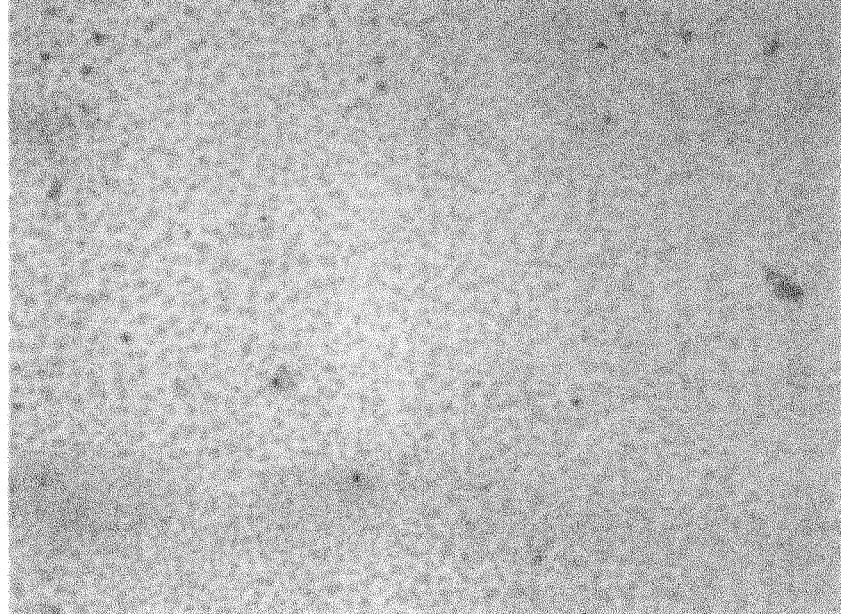
Figure 2:
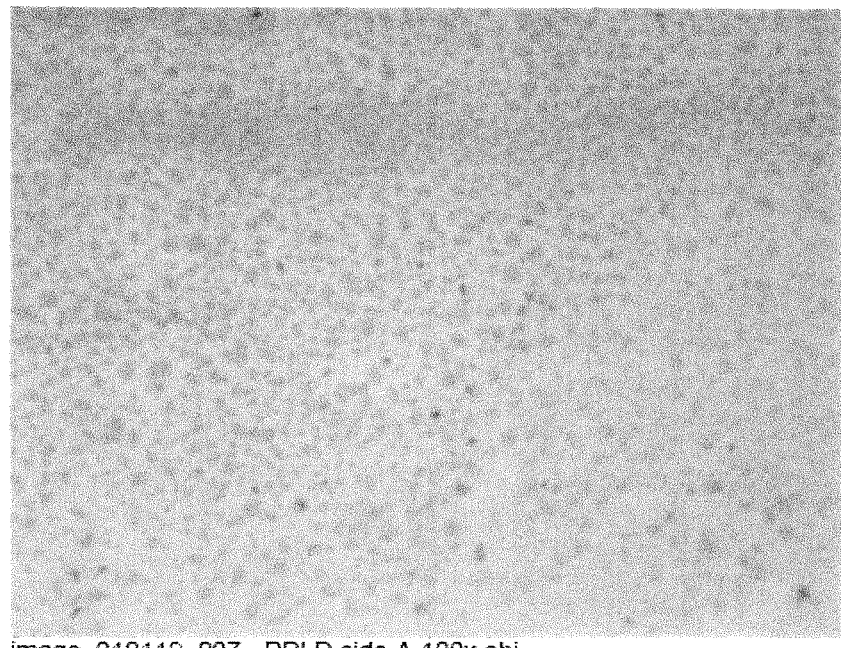
FIG. 2 are photomicrographs of the as reflowed surface of sample PPI D, sides A and B, at 100× magnification.
Figure 2:
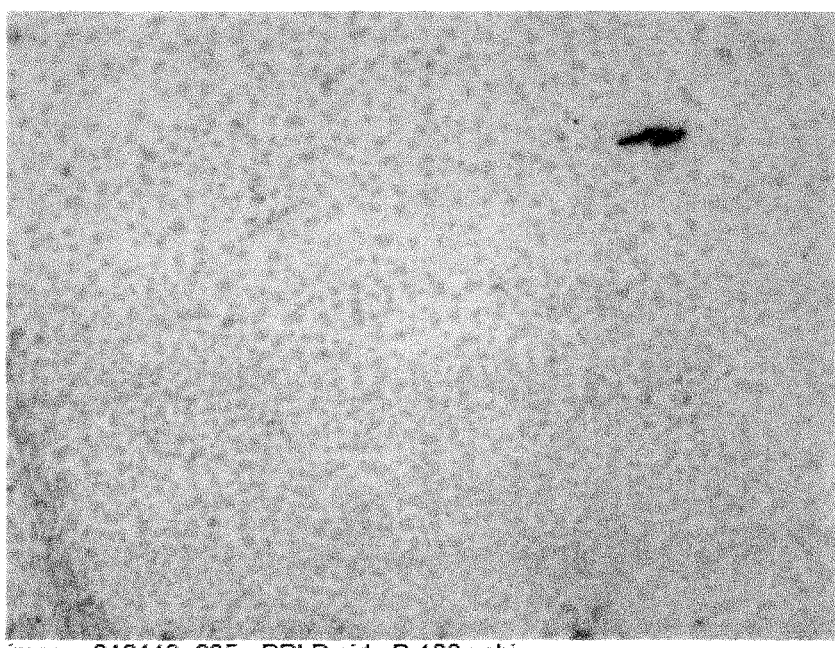
Figure 3:
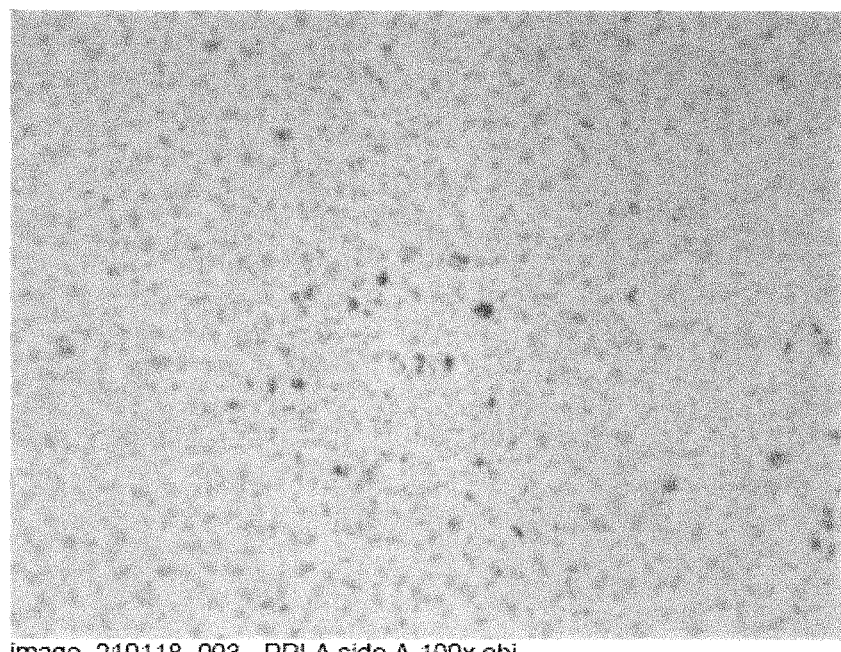
FIG. 3 are photomicrographs of the as reflowed surface of sample PPI A, sides A and B, at 100× magnification.
Figure 3:
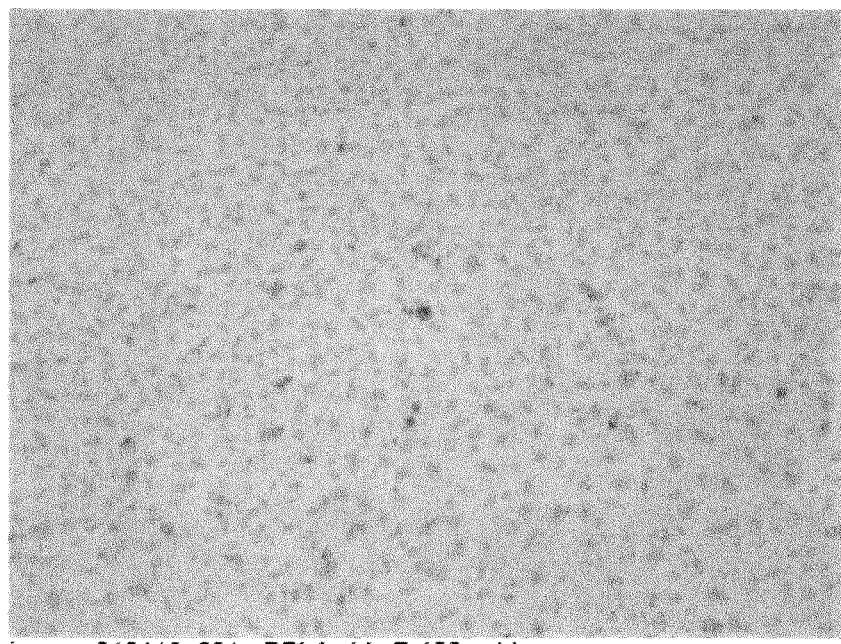
Figure 4:
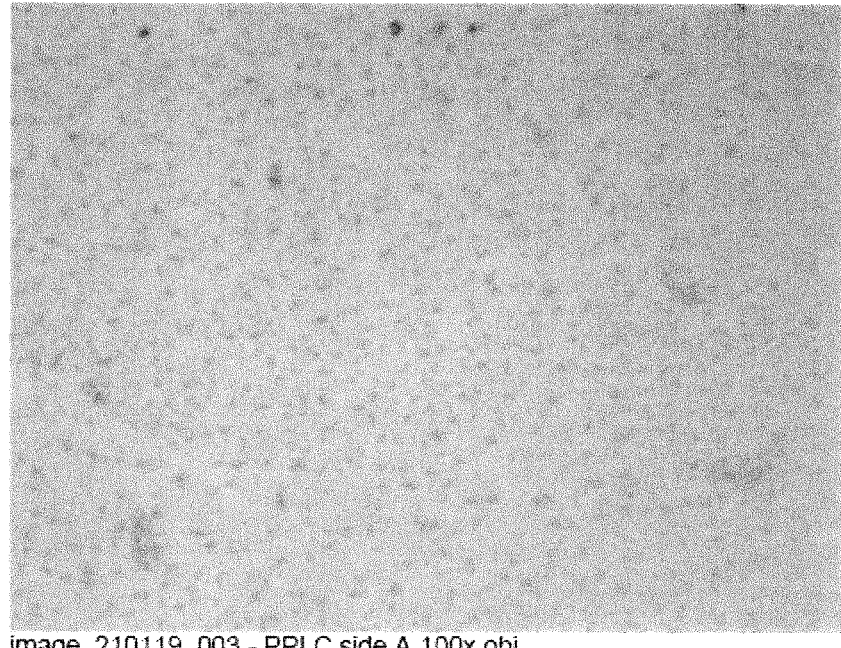
FIG. 4 are photomicrographs of the as reflowed surface of sample PPI C, sides A and B, at 100× magnification.
Figure 4:
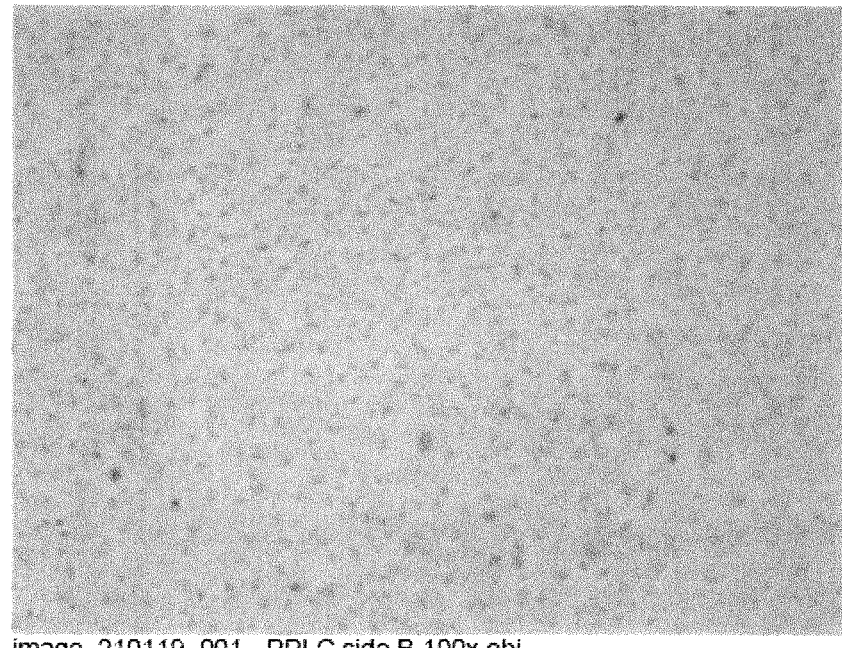
Figures 5A, 5B:
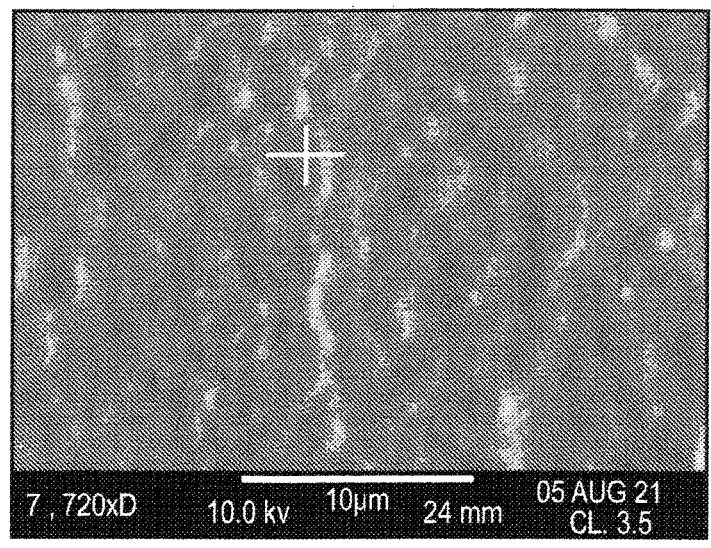
FIG. 5A is a SEM micrograph of sample PPIB at 10 kV
FIG. 5B is an EDS analysis of PPI B at the location identified in FIG. 5A.

FIG. 5B shows EDS analysis of the bluish gray phase in FIGS. 1-4. The composition of this phase—shown in the inset of the spectrum in FIG. 5B—indicates this phase is $Ag_3Sn$. The inventors surmise that the dependence of R/N on Ag thickness is concomitant result of R/N dependence on volume fraction of $Ag_3Sn$.

If the plated layer of Ag were assumed to be completely dissolved in the Sn with reflowing, then the volume fraction of $Ag_3Sn$ would depend solely on the thickness of Ag relative to the thickness of Sn before reflowing. With some assumptions, the volume fraction of $Ag_3Sn$ in the reflowed surface can be calculated from the thickness of the Ag and Sn plated layers. Assuming:

1) The Ag plated layer is completely dissolved in the Sn with reflowing.

2) There is sufficiently thick Sn to consume all of the Ag to form $Ag_3Sn$, i.e., Ag is limiting.

3) The thickness of the Ag and Sn is constant across a unit of surface area.

4) The density of the plated layers of Ag and Sn match their pure element values.

5) The density of $Ag_3Sn$ is known and matches that of the compound formed in the reflowed surface.

the volume fraction of $Ag_3Sn$, $\varphi_{Ag_3}{}^{Sn}$, in the reflowed surface would be related to the volume fraction of Ag in the plated layers, $\varphi_{Ag}$. The volume fraction of Ag over a unit of surface area would be related to the thicknesses of the plated layers simply by: $\varphi_{Ag} = t_{Ag}/(t_{Ag}+t_{Sn})$, where $t_{Ag}$=layer thickness of Ag and $t_{Sn}$=layer thickness of Sn. After substituting values for the densities and atomic weights, $\varphi_{Ag_3}{}^{Sn}$ can be closely approximated by: $\varphi_{Ag_3}{}^{Sn} \cong 1.5084 * \varphi_{Ag}$.

Table 2 gives the calculated volume fractions of Ag and $Ag_3Sn$ for samples PPI A through PPI D, sorted in order of ascending R/N. The thickness values in Table 2 are the measured values reported by sample number. The calculated values show an association of increasing R/N with a decreasing volume fraction of $Ag_3Sn$ following from a decreasing volume fraction of Ag in the plated layers. These calculations support the observed decrease of $Ag_3Sn$ in FIGS. 1 through 4, and they support the dependence of R/N on Ag thickness.

TABLE 2

Volume fraction of Ag before Reflow and $Ag_3Sn$ after Reflow

| | Layer Thickness (uin)* | | | |
|---|---|---|---|---|
| Sample | Ag | Sn | $\varphi_{Ag}$ | $\varphi_{Ag_3Sn}$ |
| PPI B | 14.3-13.7 | 36.7-37.3 | 0.280-0.269 | 0.42-0.41 |
| PPI D | 17.7-17.7 | 75.3-76.3 | 0.190-0.188 | 0.29-0.28 |
| PPI A | 5.3-5.3 | 38.0-37.3 | 0.122-0.124 | 0.18-0.19 |
| PPI C | 5.3-5.3 | 74.7-75.7 | 0.066-0.065 | 0.10 |

*Measured values reported by PPI.

This analysis of R/N should include a consideration of the thickness of the Sn layer, as thicker Sn layers are normally associated with higher R/N. Samples PPI I and PPI J have an outer layer of 97:3 Sn:Ag over a Cu/Ni barrier, so the Ag content in the reflowed surface for these two samples would have been constant at approximately 3% by weight independent of the plating thickness. These two samples differed only by the thickness of the SnAg layer.

The thickness effect mentioned above indeed was evident with PPI I and J, as shown in Table 3. The R/N was higher for the thicker layer sample (PPI J) than for the thinner layer sample (PPI I). This thickness effect was evidenced between the same two thicknesses, 37 and 75 μin, that were in the set of samples PPI A through PPI D.

TABLE 3

R/N of 97/3 SnAg Reflowed ATB Samples PPI I and J

| | Layer Thickness (uin)* | R/N | | |
|---|---|---|---|---|
| Sample | 97/3 SnAg | Side A | Side B | Sample Avg. |
| PPI I | 37.7-37.0 | 0.1730 | 0.1683 | 0.1706 |
| PPI J | 74.7-75.7 | 0.3016 | 0.1952 | 0.2484 |

*Measured values reported by PPI.

PPI I and PPI J both had an R/N that was statistically significantly lower than conventional tin coatings such as STAR, indicating that the cause of the lower R/N was the Ag in the plating. In samples PPI A through PPI D, Ag had manifested as $Ag_3Sn$ in the reflowed surface and there was an observed and calculated dependence of R/N on the volume fraction of $Ag_3Sn$.

Figure 6:
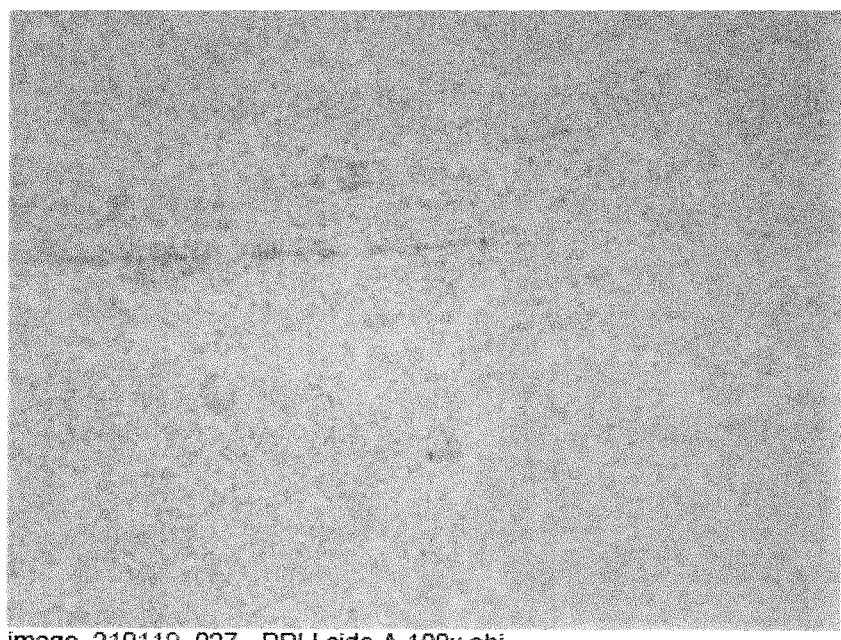
FIG. 6 are photomicrographs of the as reflowed surface of sample PPI I, sides A and B, at 100× magnification.
Figure 6:
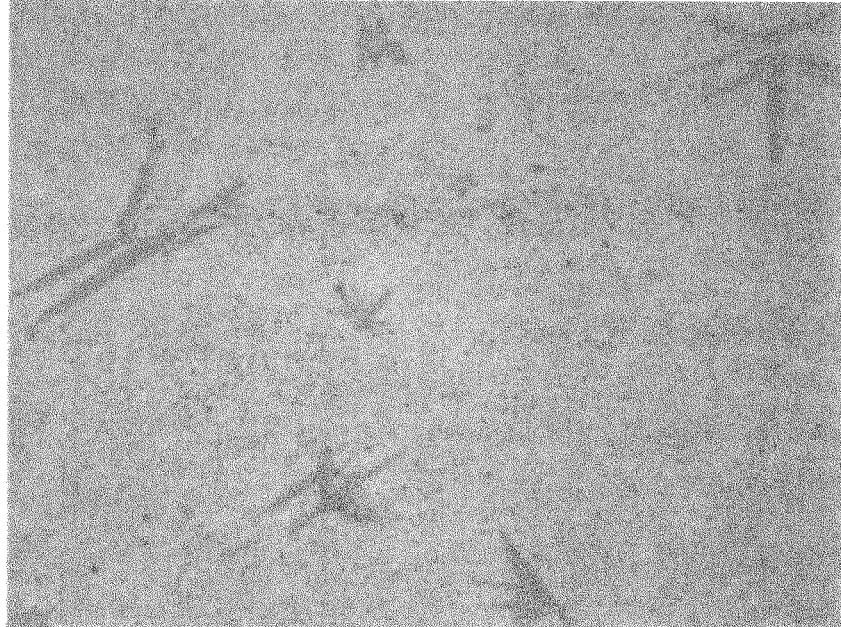
Figure 7:
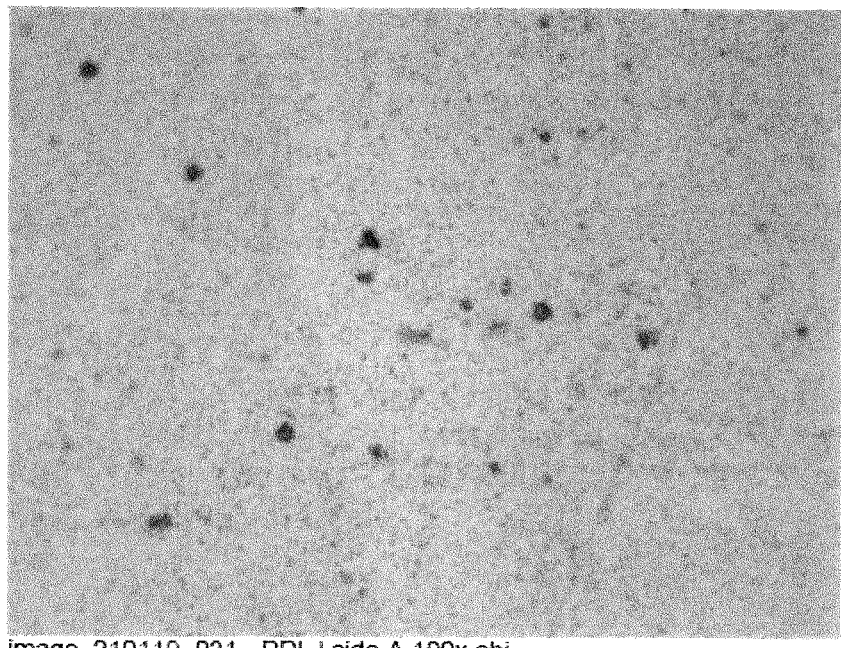
FIG. 7 are photomicrographs of the as reflowed surface of sample PPI J, sides A and B, at 100× magnification.
Figure 7:
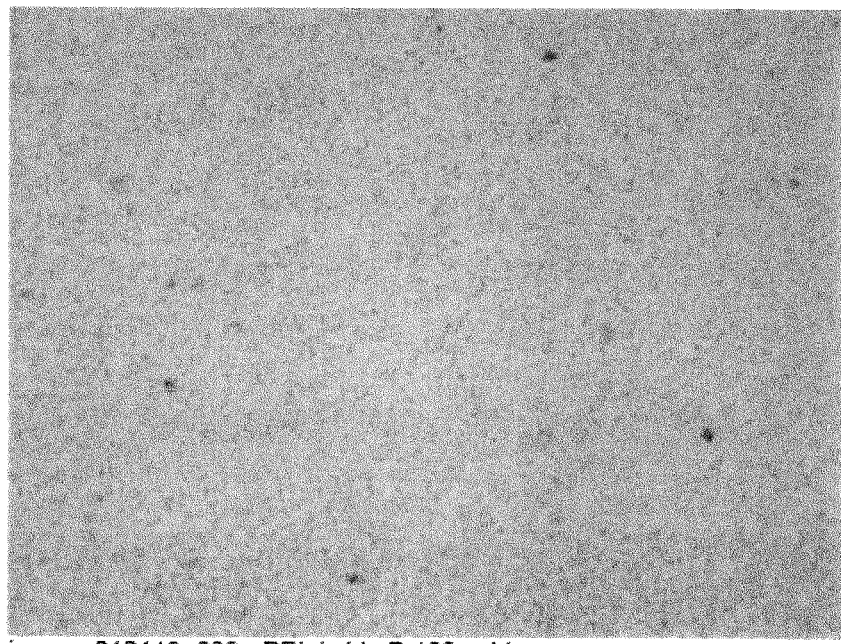

FIGS. 5 and 6 are micrographs of the reflowed surface for PPI I and PPI J, respectively. These micrographs show a small volume fraction of second phase that was finely dispersed. The micrograph for Side B of PPI I, however, shows areas of large second phase for which there is no explanation.

The volume fraction of $Ag_3Sn$ in a SnAg reflowed surface can be calculated, and would be related to the weight fraction of Ag in the plated layer, $w_{Ag}$, by the equation:

$$\varphi Ag_3Sn = \cfrac{1}{\left(\cfrac{3A_r(Ag)}{W_{Ag}(3A_r(Ag)+A_r(Sn))}-1\right)\cfrac{\rho Ag_3Sn}{\rho Sn}+1}$$

Using this equation and the densities and atomic weights of Ag, Sn, and Ag3Sn, the volume fraction of $Ag_3Sn$ in the reflowed layer of a $97/3$ SnAg plating ($w_{Ag}$=0.03) would be $\varphi_{Ag3Sn}$=0.0304. With the calculated volume fraction of $Ag_3Sn$ in the $97/3$ SnAg layer, PPI I and J are compared to samples PPI A through PPI D in Table 4. The samples in this table are grouped by thickness to account for its effect, and they are sorted in ascending order of R/N within each group. Table makes evident the effect of the volume fraction of $Ag_3Sn$. The low volume fraction SnAg samples had the highest R/N within each group. In both groups of samples, the R/N increases with decreasing volume fraction of $Ag_3Sn$.

A key assumption in the calculation of the volume fraction of Ag3Sn was that the Ag layer would be completely dissolved in the Sn with reflowing. This assumption is borne out by the cross sections of the reflowed surfaces of samples A and B, which show that the underlayer of Ag had completely dissolved with reflowing.

Figure 8:
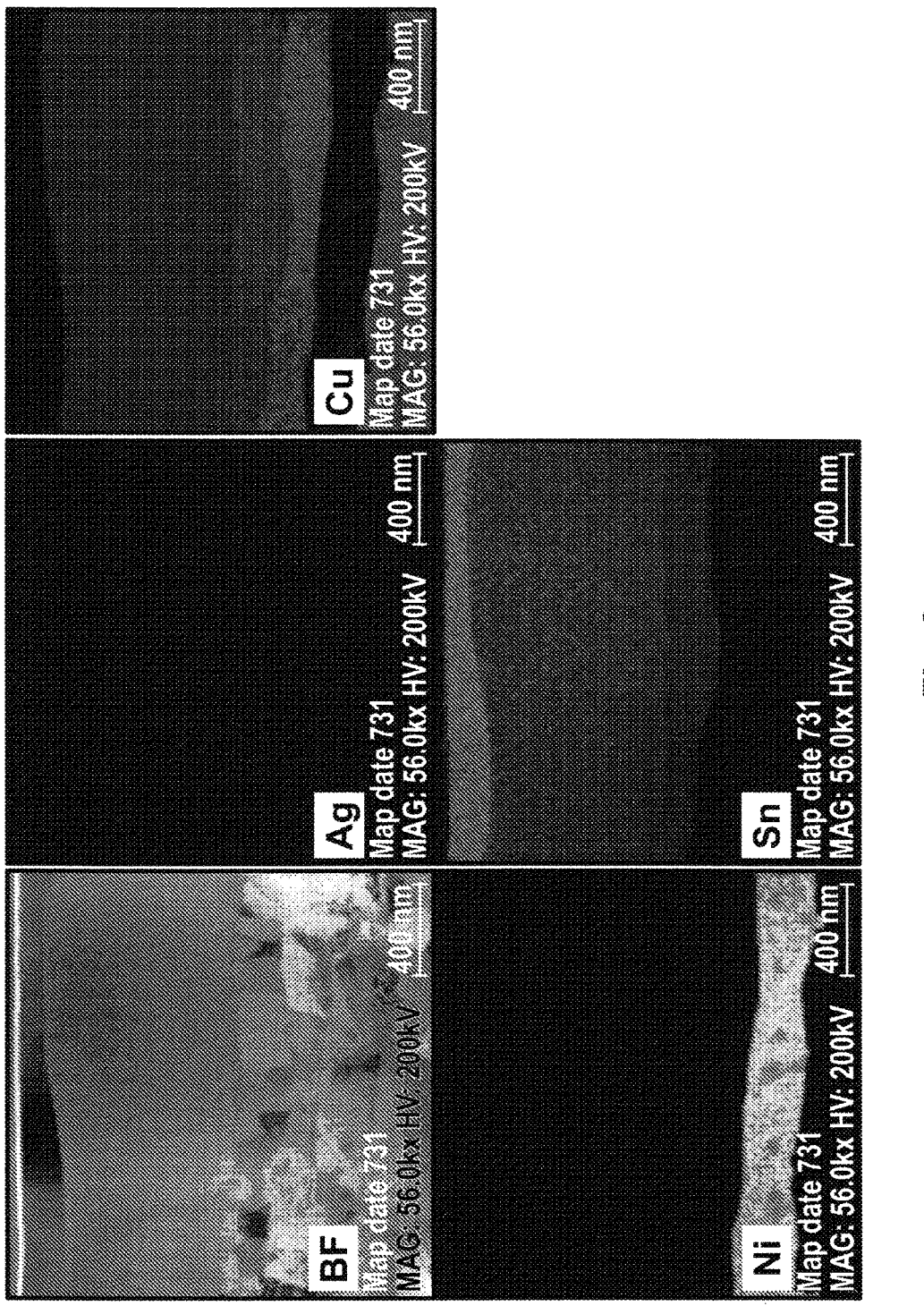
FIG. 8 is a TEM image and EDS map of sample PPI A, showing the absence of a silver layer, and the presence of a copper layer.
Figure 9:
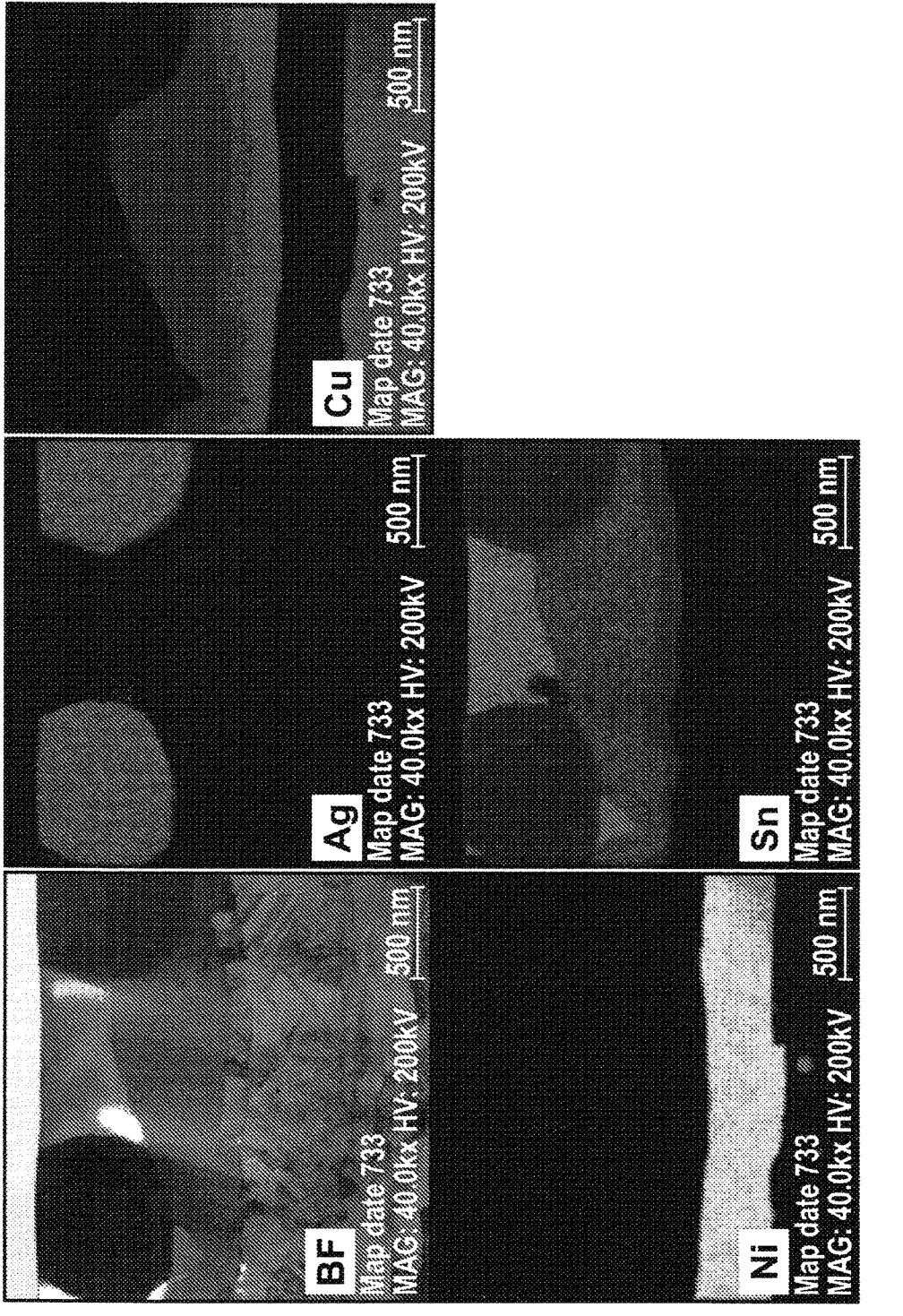
FIG. 9 is a TEM image and EDS map of sample PPI B, showing the absence of a silver layer, and the presence of a copper layer.

Cross sections of the reflowed surfaces of PPI A and PPI B were made by focused ion beam (FIB) milling and examined by transmission electron microscope (TEM). Cross sectioning by FIB had the advantage that negligible deformation and heat would be introduced to the samples, and examination by TEM allowed high resolution magnification to accurately determine of the morphology, composition, and thickness of the individual layers and phases. FIGS. 8 and 9 show TEM images and EDS maps from the FIB cross sections. The Ag maps show there was no Ag layer remaining in either sample, further validating the assumption of the $Ag_3Sn$ calculation that the Ag layer is completely dissolved in the Sn with reflowing.

Distinct layers of Ni, Cu, $Cu_3Sn$, $Cu_6Sn_5$, and Sn were seen in the TEM images of both PPI A and PPI B, and areas of $Ag_3Sn$ were seen at the surface of PPI B. The FIB lamella of PPI A did not contain any $Ag_3Sn$ phase, which the inventors believe is attributable to the lower volume fraction of $Ag_3Sn$ in this sample which may have caused the lamella to not contain any of this phase by chance.

The Cu maps show that each sample contained a significant thickness of Cu layer after reflowing. This is notable because existing tin coatings such as STAR and ATB were meant to have no Cu layer—or very little Cu layer—after reflowing so that Cu would not be available for uninhibited intermetallic compound growth with heat aging.

Figure 10:
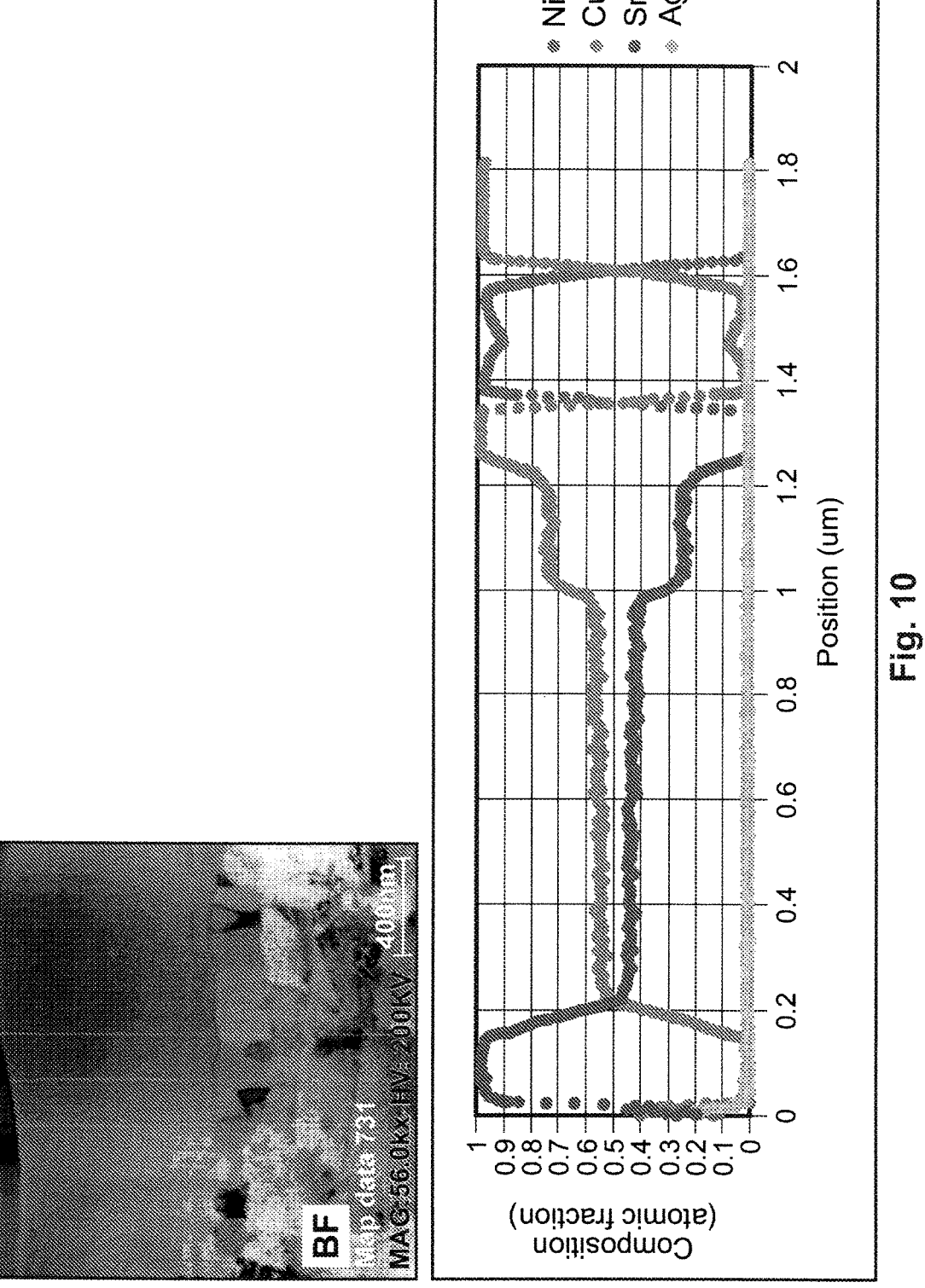
FIG. 10 is an EDS line scan of sample PPI A.

FIG. 10 presents a line scan analysis on PPI A. The atomic compositions of $Cu_6Sn_5$ (54.5 at % Cu, 45.5 at % Sn) and $Cu_3Sn$ (75 at % Cu, 25 at % Sn) are clearly seen in this line scan. This scan shows that there was a layer of pure Sn at the surface. The $Cu_6Sn_5$ phase is seen adjacent to the pure Sn layer as a single large grain. The $Cu_3Sn$ phase is seen as a layer of very fine grains—with a grain size of approximately 130 nm—located between the $Cu_6Sn_5$ and the Cu layer.

Figure 11:
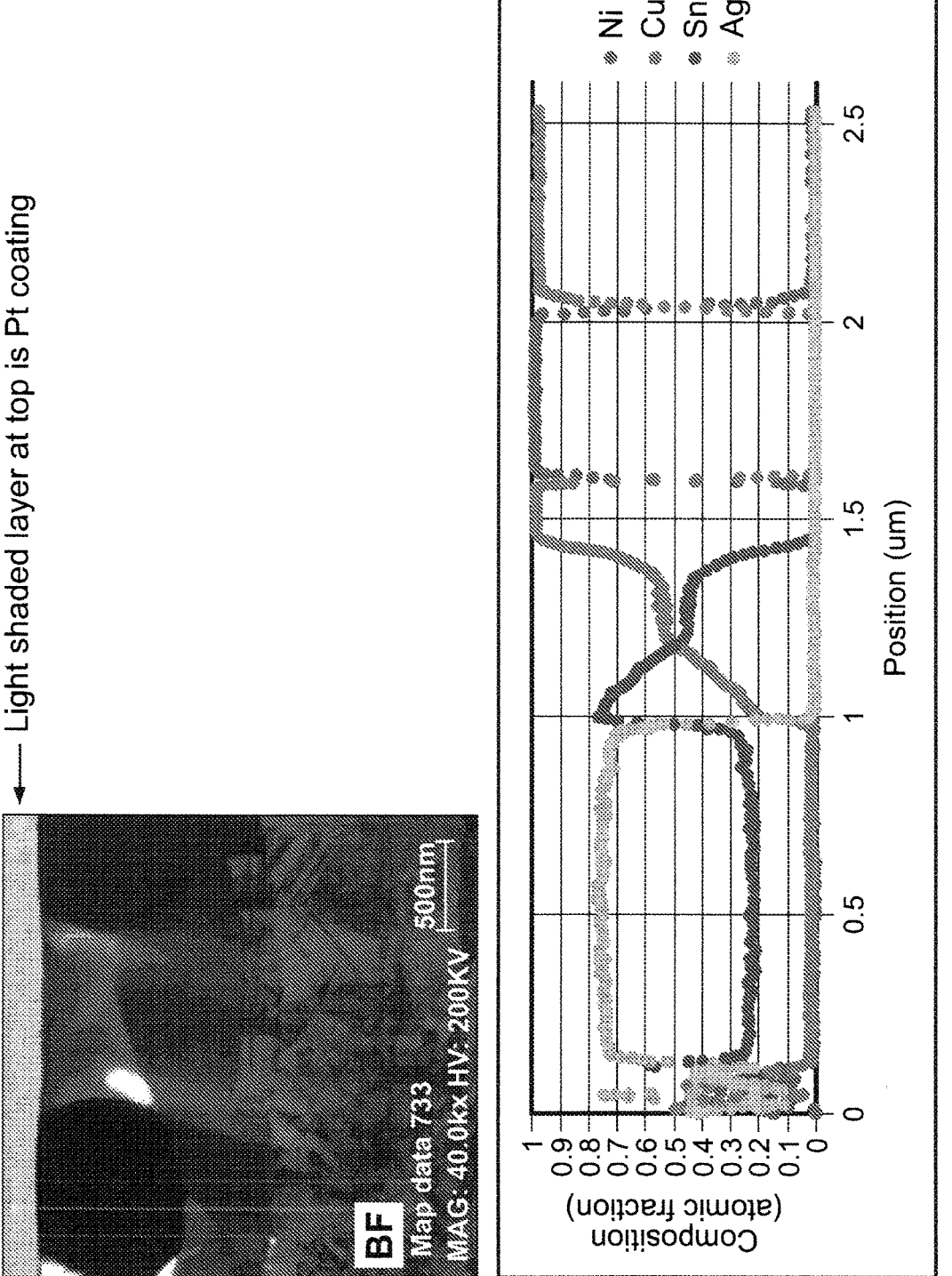
FIG. 11 is an EDS line scan of sample PPI B.
Figure 12:
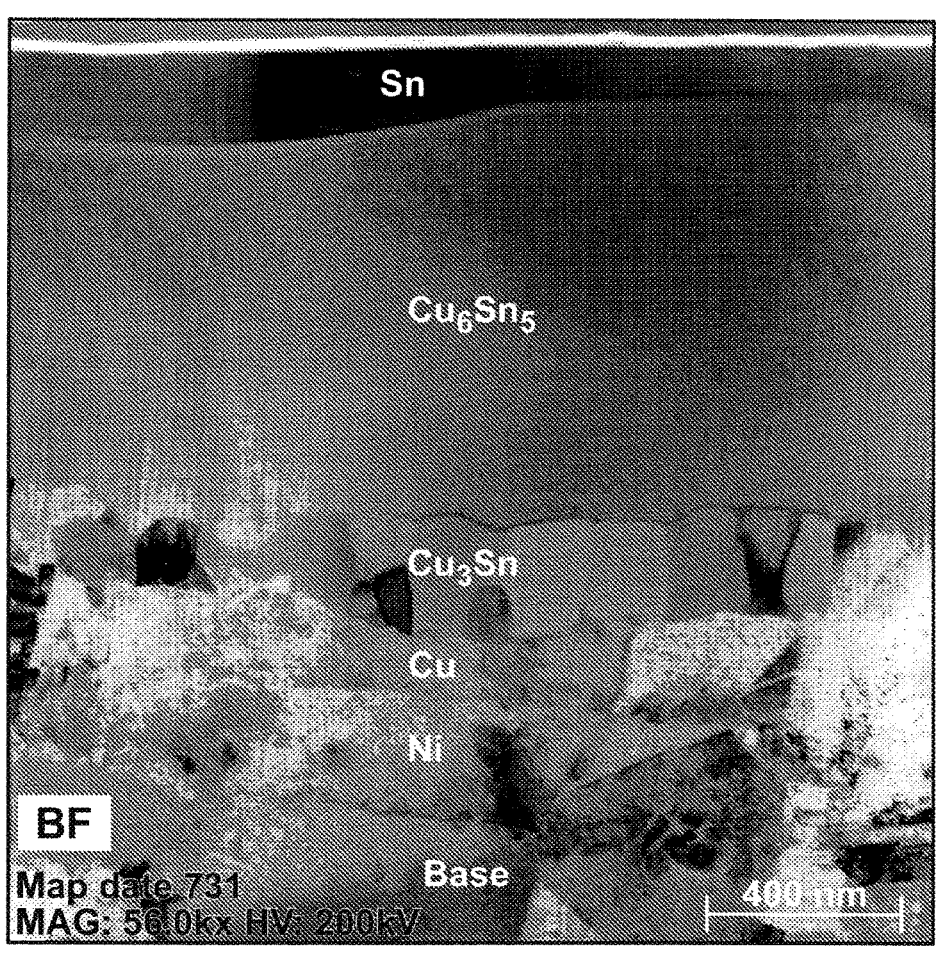
FIG. 12 is a TEM image of sample PPI A with layers and phases identified.

FIG. 11 presents a line scan analysis on PPI B. The atomic composition of $Ag_3Sn$ (75 at % Ag, 25 at % Sn) is clearly seen in this scan in the large Ag-containing phase at the surface. The EDS map for this sample, in FIG. 9, shows that just below the $Ag_3Sn$ phase through which the line scan was made there is a small region of pure Sn. In the line scan, this region is detected starting at approximately 0.98 μm. The scan through this small region of pure Sn was positioned such that it passed just along the edge, close enough to the adjacent $Cu_6Sn_5$ that Cu x-rays were detected. This explains why the Sn line in the graph at about 1 um attained only 80 at % Sn and why the Sn content steadily decreased as the scan progressed through this region; and it would explain why Cu was detected in this area. The line scan shows that beneath this small region of Sn, at approximately 1.20 to 1.35 μm along the scan, the composition of Cu and Sn is approximately constant and is consistent with $Cu_6Sn_5$ (54.5 at % Cu, 45.5 at % Sn). The area along the line scan between the $Cu_6Sn_5$ and the Cu layer contained a very small layer of $Cu_3Sn$—as seen by the fine-grained morphology of similar grain size as PPI A, and as seen in the EDS map in FIG. 9 which showed a higher level of Cu and lower level of Sn in this layer. The line scan, however, passed along the very edge of this thin layer of fine grains so that the EDS could not resolve the composition of the $Cu_3Sn$.

The thicknesses of the as-plated layers of Ni, Cu, Ag, and Sn before reflowing, as measured by XRF and reported by PPI, are given in Table 5 for samples A through D.

TABLE 5

| | Layer Thicknesses before Reflowing | | | |
| | | Layer Thickness (uin)* | | |
| Sample | Ni | Cu | Ag | Sn |
|---|---|---|---|---|
| PPI A | 17.7-17.3 | 16.7-17.0 | 5.3-5.3 | 38.0-37.3 |
| PPI B | 17.0-17.7 | 16.3-15.7 | 14.3-13.7 | 36.7-37.3 |
| PPI C | 16.7-16.0 | 16.0-16.3 | 5.3-6.3 | 74.7-75.7 |
| PPI D | 17.7-17.3 | 15.3-15.0 | 17.7-17.7 | 75.3-76.3 |

*Measured values reported by PPI.

The thicknesses of the layers and phases of the as-reflowed samples of PPI A and PPI B were measured from the TEM images and EDS maps given in FIGS. 12-15. These images and maps show the full thickness of the Ni layer along with the outer plated surface in the same image. The thickness measurements were made sequentially at 10 equally spaced locations across each image, as shown in the EDS maps of FIGS. 13 and 15, with location 1 being the leftmost location. The thickness measurements are given in Tables 6 and 7.

TABLE 6

Layer Thicknesses after Reflowing for PPI A from FIB-TEM

Figure 13:
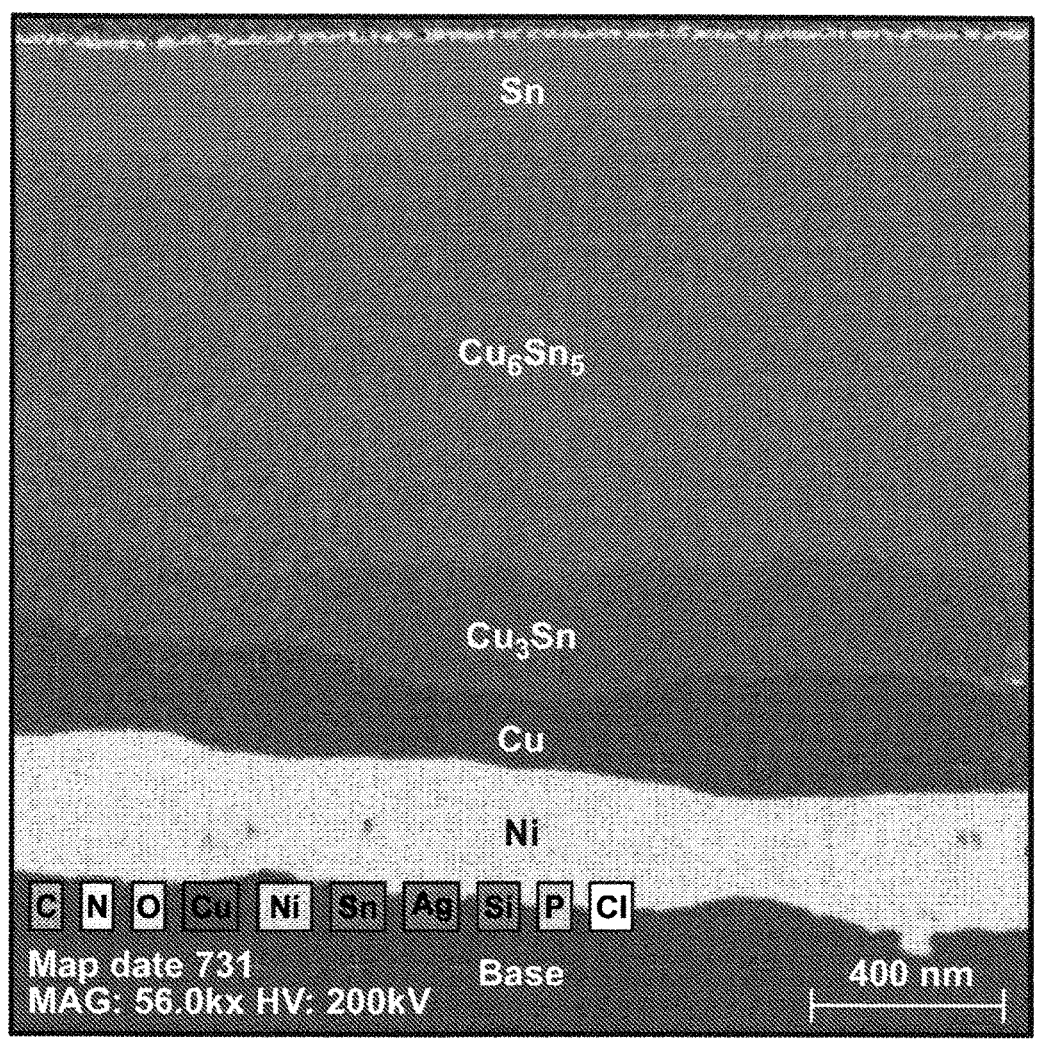
FIG. 13 is a composite EDS map of PPI A with crosshairs showing locations of layer thickness measurement.
Figure 14:
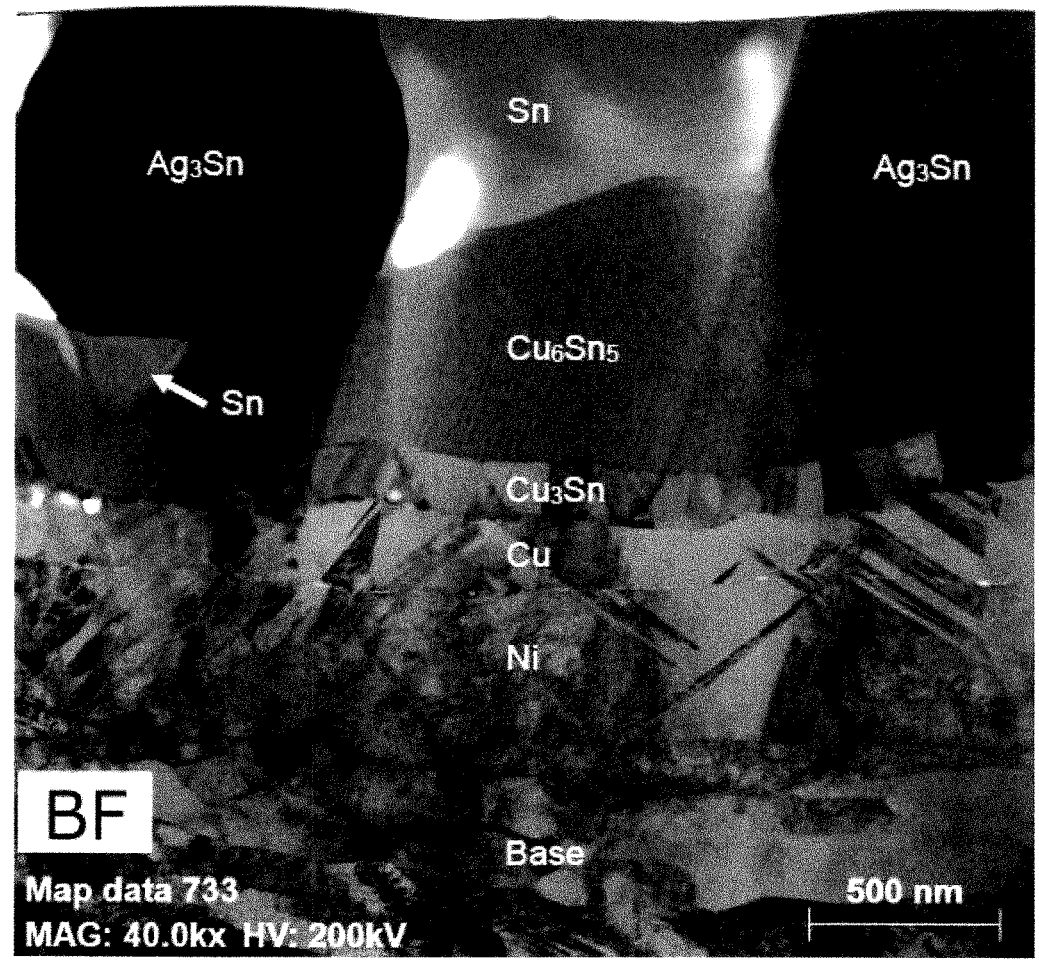
FIG. 14 is a TEM image of sample PPI A with layers and phases identified.

| | Location in FIG. 13 (left to right) | | | | | | | | | | |
| Layer | 1 | 2 | 3 | 4 | 5 | 6 | 7 | 8 | 9 | 10 | Avg. |
|---|---|---|---|---|---|---|---|---|---|---|---|
| | Layer Thickness in nm | | | | | | | | | | |
| Sn | 165.1 | 183.5 | 189.7 | 176.1 | 151.5 | 118.2 | 104.7 | 94.8 | 85.0 | 94.8 | 136.4 |
| $Ag_3Sn$ | — | — | — | — | — | — | — | — | — | — | — |
| $Cu_6Sn_5$ | 724.2 | 762.4 | 780.9 | 769.8 | 817.9 | 872.1 | 868.4 | 856.0 | 861.0 | 881.9 | 819.5 |
| $Cu_3Sn$ | 160.7 | 142.9 | 131.8 | 198.3 | 224.8 | 227.9 | 206.9 | 220.5 | 219.2 | 204.5 | 193.7 |
| Cu | 204.9 | 167.5 | 201.0 | 159.6 | 128.1 | 128.1 | 191.1 | 220.7 | 218.7 | 195.1 | 181.5 |
| Ni | 265.0 | 288.2 | 212.8 | 232.0 | 257.1 | 255.7 | 230.5 | 186.2 | 255.7 | 254.2 | 243.7 |
| | Layer Thickness in uin | | | | | | | | | | |
| Sn | 6.50 | 7.23 | 7.47 | 6.93 | 5.96 | 4.66 | 4.12 | 3.73 | 3.35 | 3.73 | 5.37 |
| $Ag_3Sn$ | — | — | — | — | — | — | — | — | — | — | — |
| $Cu_6Sn_5$ | 28.51 | 30.02 | 30.74 | 30.31 | 32.20 | 34.33 | 34.19 | 33.70 | 33.90 | 34.72 | 32.26 |
| $Cu_3Sn$ | 6.33 | 5.63 | 5.19 | 7.81 | 8.85 | 8.97 | 8.15 | 8.68 | 8.63 | 8.05 | 7.63 |
| Cu | 8.07 | 6.59 | 7.91 | 6.28 | 5.04 | 5.04 | 7.52 | 8.69 | 8.61 | 7.68 | 7.14 |
| Ni | 10.43 | 11.35 | 8.38 | 9.13 | 10.12 | 10.07 | 9.08 | 7.33 | 10.07 | 10.01 | 9.60 |

TABLE 7

Layer Thicknesses after Reflowing for PPI B from FIB-TEM

Figure 15:
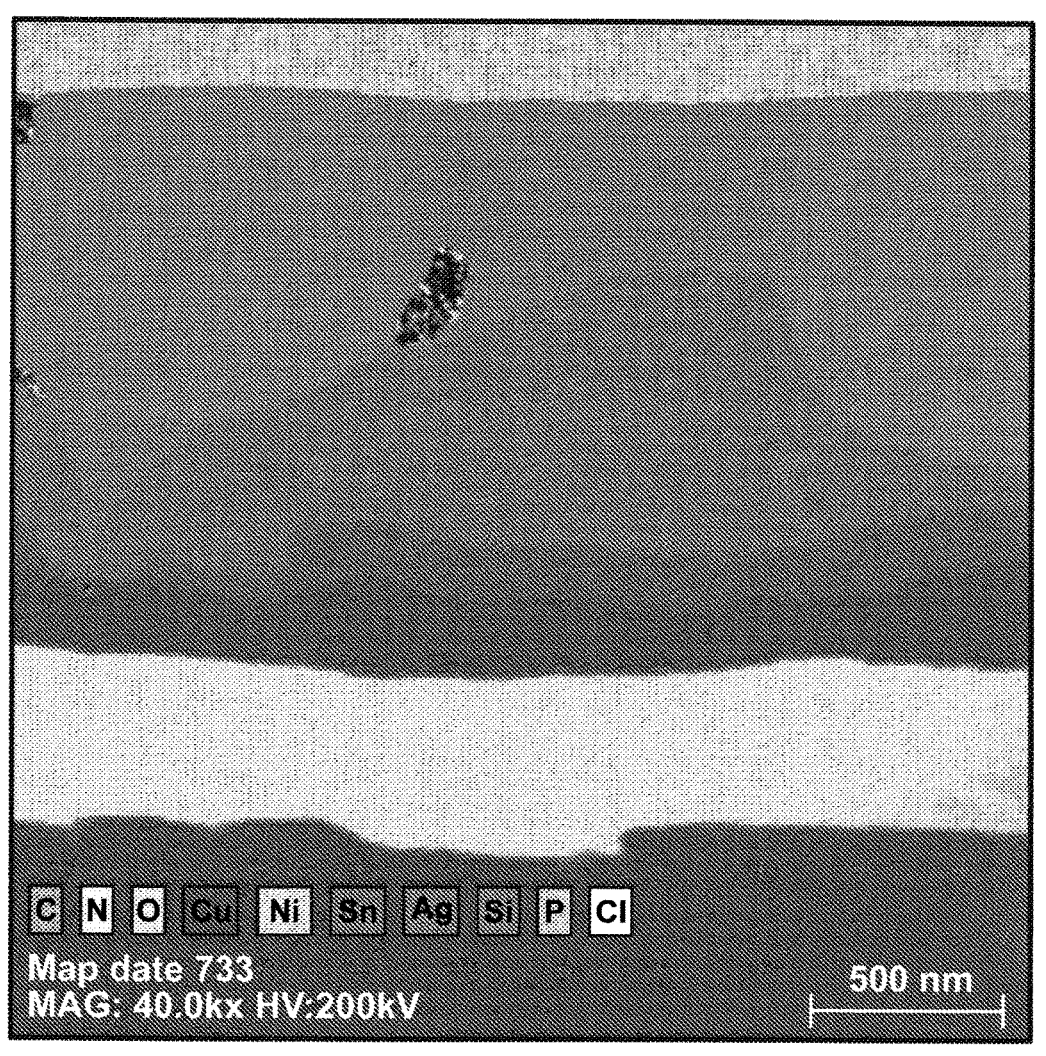
FIG. 15 is a composite EDS map of PPI A with crosshairs showing locations of layer thickness measurement.

| | Location in FIG. 15 (left to right) | | | | | | | | | | |
| Layer | 1 | 2 | 3 | 4 | 5 | 6 | 7 | 8 | 9 | 10 | Avg. |
|---|---|---|---|---|---|---|---|---|---|---|---|
| | Layer Thickness in nm | | | | | | | | | | |
| Sn | 62.5 | 104.2 | — | — | — | — | 575.9 | 496.9 | 430.8 | 430.8 | 210.1 |
| $Ag_3Sn$ | 781.8 | 854.7 | 833.9 | 705.3 | — | — | — | — | 875.6 | 965.9 | 501.7 |
| $Cu_6Sn_5$ | 441.3 | 257.1 | 448.2 | 406.5 | 566.3 | 654.9 | 750.5 | 719.2 | 253.6 | 122.5 | 462.0 |
| $Cu_3Sn$ | — | 52.1 | 66.0 | 139.0 | 145.9 | 135.5 | 145.9 | 104.2 | 159.8 | 156.4 | 110.5 |
| Cu | 177.2 | 173.7 | 145.9 | 250.2 | 194.6 | 198.0 | 163.3 | 184.1 | 180.7 | 239.7 | 190.7 |
| Ni | 466.7 | 437.5 | 412.5 | 427.8 | 461.1 | 475.0 | 402.8 | 430.6 | 427.8 | 422.2 | 436.4 |
| | Layer Thickness in uin | | | | | | | | | | |
| Sn | 2.46 | 4.10 | — | — | — | — | 22.67 | 19.56 | 16.96 | 16.96 | 8.27 |
| $Ag_3Sn$ | 30.78 | 33.65 | 32.83 | 27.77 | — | — | — | — | 34.47 | 38.03 | 19.75 |
| $Cu_6Sn_5$ | 17.37 | 10.12 | 17.65 | 16.00 | 22.30 | 25.79 | 29.55 | 28.32 | 9.99 | 4.82 | 18.19 |
| $Cu_3Sn$ | — | 2.05 | 2.60 | 5.47 | 5.75 | 5.33 | 5.75 | 4.10 | 6.29 | 6.16 | 4.35 |
| Cu | 6.98 | 6.84 | 5.75 | 9.85 | 7.66 | 7.80 | 6.43 | 7.25 | 7.11 | 9.44 | 7.51 |
| Ni | 18.37 | 17.22 | 16.24 | 16.84 | 18.15 | 18.70 | 15.86 | 16.95 | 16.84 | 16.62 | 17.18 |

The parameters for calculating the thickness of plating consumed and thickness of intermetallic compound (IMC) formed are set out in Table 8. Parameters a and b allow for calculation of the thickness consumed of elements A and B to form a given IMC thickness of $A_xB_y$. The reciprocal of these parameters, $a^{-1}$ and $b^{-1}$, allow for calculation of the thickness of the IMC formed by reaction of given thicknesses of A or B. The ratio of the parameters a and b allow for calculation of the thickness consumed for the reactant elements. For example, for a given thickness consumed of element A to form $A_xB_y$, the b/a ratio gives the thickness of B that would be consumed in the reaction, and vice versa for the a/b ratio for a given thickness consumed of element B.

TABLE 8

| Parameters for Layer and IMC Thickness | | | |
|---|---|---|---|
| Parameter | Ag₃Sn | Cu₃Sn | Cu₆Sn₅ |
| a $(t_{A,cons.}/t_{A_xB_y})$ | 0.69096 | 0.61213 | 0.36144 |
| $a^{-1}$ $(t_{A_xB_y}/t_{A,cons})$ | 1.44727 | 1.63364 | 2.76672 |
| b $(t_{B,cons.}/t_{A_xB_y})$ | 0.36598 | 0.47010 | 0.69394 |
| $b^{-1}$ $(t_{A_xB_y}/t_{B,cons.})$ | 2.73236 | 2.12719 | 1.44104 |
| a/b $(t_{A,cons}/t_{B,cons.})$ | 1.88794 | 1.30212 | 0.52085 |
| b/a $(t_{B,cons.}/t_{A,cons})$ | 0.52968 | 0.76798 | 1.91995 |

With these parameters, the thicknesses of the plated layers of Ag, Cu, and Sn before reflowing can be back-calculated which there would be no barrier to diffusion with heat aging; therefore, a high rate of growth of Cu—Sn IMC would occur until the excess Cu were consumed. If the plated Cu were to be too large, it could consume all of the Sn in a short amount of time of heat aging. Calculation of the amount of Sn consumed after short-time heat aging, such as at 150° C./1wk, for given thicknesses of Ag and Cu can be made straightforwardly using the a and b parameters in Table 8. The equation for the amount of Sn consumed is:

$$tSn, cons. = (b/a) Ag3Sn tAg + (b/a) Cu6Sn5 tCu$$

where tSn, cons.=thickness of Sn consumed as IMC and tAg and tCu=plated thicknesses of Ag and Cu, respectively, which would be fully consumed as IMC after short-time heat aging. From Table 8, (b/a)Ag3Sn=0.52968 and (b/a)Cu6Sn5=1.91995.

Table 10 shows the results of calculations made for PPI samples A through D. The results of the calculations for samples A and B show that very little or no free Sn would be remaining for these samples; PPI A would have 2~3 uin of free Sn and PPI B would have no free Sn. PPI C and D would each have approximately 40 uin of free Sn.

TABLE 10

| Eq. (5) Thickness of Sn Consumed as IMC for PPI A through D | | | | | | | |
|---|---|---|---|---|---|---|---|
| | Layer Thickness (uin)* | | | Calculated Thickness of Sn Consumed as IMC (uin) | | | Calc. Free Sn Remaining |
| Sample | Cu | Ag | Sn | By Cu | By Ag | Total Eq. (5) | (uin) |
| PPI A | 16.7-17.0 | 5.3-5.3 | 38.0-37.3 | 32.1-32.6 | 2.8-2.8 | 34.9-35.4 | 3.1-1.9 |
| PPI B | 16.3-15.7 | 14.3-13.7 | 36.7-37.3 | 31.3-30.1 | 7.6-7.3 | 38.9-37.4 | 0-0 |
| PPI C | 16.0-16.3 | 5.3-5.3 | 74.7-75.7 | 30.7-31.3 | 2.8-2.8 | 33.5-34.0 | 41.2-41.7 |
| PPI D | 15.3-15.0 | 17.7-17.7 | 75.3-76.3 | 29.4-28.8 | 9.4-9.4 | 38.8-38.2 | 36.5-38.1 |

*Measured values reported by PPI.

from the measurements in Tables 6 and 7. The results of these calculations are shown in Table 9 and are compared to the results reported by sample number.

TABLE 9

| Back-calculated As-Plated Layer Thicknesses (before Reflowing) | | | | |
|---|---|---|---|---|
| | | As-plated Thickness (uin) | | |
| Sample | Method | Cu | Ag | Sn |
| PPI A | Back-calculated from Table 6 | 23.5 | — | 31.3 |
| | Reported by PPI (XRF) | 16.7-17.0 | 5.3-5.3 | 38.0-37.3 |
| PPI B | Back-calculated from Table 7 | 16.7 | 13.6 | 30.2 |
| | Reported by PPI (XRF) | 16.3-15.7 | 14.3-13.7 | 36.7-37.3 |

The back-calculated results are in good agreement with those reported by sample, given that the back-calculated values are based on an extremely small statistical sample of a single cross section from a FIB cut covering a very small area of the plated surface.

The idea of existing tin-coating systems with barriers, such as ATB and STAR is that the Cu/Ni barrier slows the growth of Cu—Sn IMC by slowing the diffusion of Cu from the base material. However, if the thickness of plated Cu becomes large, excess Cu could exist after reflowing for Table 11 shows values for the calculated amount of Sn that would be consumed as IMC in short-time aging for various combinations of Ag and Cu thicknesses. For standard ATB, the Cu specification is 7 to 18 uin. The minimum Sn thickness for standard ATB is 40 uin and there is no Ag plating. Table 11 shows that a minimum of 5 μin of free Sn would exist for standard ATB after short-time aging, i.e., at the maximum Cu thickness of 18 μin there would be 34.6 μin of Sn consumed as IMC, leaving 5.4 μin of free Sn.

TABLE 11

| Eq. (5) Thickness of Sn Consumed as IMC with Ag and Cu | | | | |
|---|---|---|---|---|
| | Calculated Thickness of Sn Consumed as IMC (uin) | | | |
| $t_{Cu}$ (uin) | $t_{Ag} = 0$ | $t_{Ag} = 5$ iun | $t_{Ag} = 10$ iun | $t_{Ag} = 15$ uin |
| 7 | 13.4 | 16.1 | 18.7 | 21.4 |
| 8 | 15.4 | 18.0 | 20.7 | 23.3 |
| 9 | 17.3 | 19.9 | 22.6 | 25.2 |
| 10 | 19.2 | 21.8 | 24.5 | 27.1 |
| 11 | 21.1 | 23.8 | 26.4 | 29.1 |
| 12 | 23.0 | 25.7 | 28.3 | 31.0 |
| 13 | 25.0 | 27.6 | 30.3 | 32.9 |
| 14 | 26.9 | 29.5 | 32.2 | 34.8 |
| 15 | 28.8 | 31.4 | 34.1 | 36.7 |
| 16 | 30.7 | 33.4 | 36.0 | 38.7 |

TABLE 11-continued

| Eq. (5) Thickness of Sn Consumed as IMC with Ag and Cu | | | | |
|---|---|---|---|---|
| | Calculated Thickness of Sn Consumed as IMC (uin) | | | |
| $t_{Cu}$ (uin) | $t_{Ag} = 0$ | $t_{Ag} = 5$ iun | $t_{Ag} = 10$ iun | $t_{Ag} = 15$ uin |
| 17 | 32.6 | 36.3 | 37.9 | 40.6 |
| 18 | 34.6 | 37.2 | 39.9 | 42.5 |

To apply the addition of silver according to the principles of this disclosure to conventional ATB, either the specified maximum Cu would need to be decreased or the specified minimum Sn would need to be increased relative to standard ATB in order to ensure 5 μin of free Sn would be available after short-time aging—i.e., to ensure the same amount of free Sn as standard ATB. For example, as shown in Table 10, for 15 μin of Ag and 18 μin of Cu there would be 42.5 μin of Sn consumed as IMC after short-time aging; to ensure 5 μin of free Sn at these Ag and Cu thicknesses, the minimum specification for Sn would need to be 48 μin.

Considered another way, for a minimum Sn thickness of 40 μin and a maximum Ag thickness of 15 μin, the maximum Cu thickness would need to be less than or equal to 14 μin ensure 5 μin of free Sn after short-time aging. Other combinations of thicknesses would be possible as well. The point here is that for silver to be applied to ATB, the Cu and/or the Sn specifications would need to be different than standard ATB in order ensure free Sn would be available after short-time aging.

In a particularly preferred embodiment, to help ensure the presence of $Ag_3Sn$ intermetallic compounds in the reflowed surface, the thickness of the Cu layer is reduced, and/or the thickness of the Sn layer increased to ensure that free Sn remains available after short-time heat aging. In this particularly preferred embodiment, there is preferably between about 5 and 15 μin of Ag with Cu/Ni thicknesses that would ensure at least 5 μin of free Sn after short-time aging. One possible configuration focusing on the reduction of Cu thickness is 40-80 μin of Sn over 5-15 μin Ag over 7-14 μin Cu over 5-20 μin of Ni. Another possible configuration focusing on increasing Sn is 50-80 μin of Sn over 5-15 μin Ag over 7-18 μin Cu over 5-20 μin of Ni.

Table 12 shows additional data, with Sample 7 illustrating the low copper preferred embodiment.

less than or equal to 0.2 and more preferably less than or equal to 0.18, with silver layers totaling 10 μin.

These embodiments also result in a free tin layer of at least 5 μin after heat aging at 150° C. according to the SAE USCAR2-8 (2022) (the entire content of which is incorporated herein by reference), indicating the desirable friction and electrical properties of the connectors with the coatings will remain during the service life of the connector.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A copper alloy electrical connector component having a coating thereon comprising a nickel layer of between about 5 μin and about 20 μin over the copper alloy;

applying a copper layer of between about 7 μin and about 18 μin over the nickel layer; a total of between about 5 μin and about 15 μin of one or more silver layers and a total of between about 40 μin and about 80 μin of one or more tin layers over the copper layer, wherein subsequent reflow heating of the connector will cause mixing of the silver and tin layers and formation of between about 8 vol % and about 45 vol % of an $Ag_3Sn$ intermetallic.

2. The copper alloy electrical connector component according to claim 1 wherein the one or more silver layers are applied as a single layer over the copper layer, and the one or more tin layers are applied as a single layer over the silver layer.

3. The copper alloy electrical connector component according to claim 1 wherein the one or more silver layers and the one or more tin layers are applied as a plurality of alternating layers of silver and of tin.

4. The copper alloy electrical connector component according to claim 1 wherein after reflow heating the coating gives the connector component an R/N of between about 0.20 and about 0.13.

| | | Contact Resistance, Rc (mohms) | | | | |
|---|---|---|---|---|---|---|
| Sample | Asis R/N Side A | Asis R/N Side B | Asis Rc asis Side A | Asis Rc asis Side B | 150 C./1 w Rc 1 wk Side A | 150 C./1 w Rc 1 wk Side B |
| 1. PPI coil 706208: 23 uin Reflow Sn over 17 uin Ag over 6 uin Ni | 0.14 | 0.24 | 3.4 | 2.5 | 6.0 | 6.1 |
| 2. PPI coil 706479: 21 uin Reflow Sn over 10 uin Ag over 6 uin Ni | 0.34 | 0.31 | 3.8 | 1.8 | 10.3 | 11.2 |
| 3. PPI coil 706480: 22 uin Reflow Sn over 3 uin Ag over 6 uin Ni | 0.25 | 0.23 | 3.1 | 2.8 | 21.1 | 14.1 |
| 4. PPI coil 706481: 21 uin Reflow Sn over 10 uin Ag over 3 uin Cu over 6 uin Ni | 0.15 | 0.13 | 1.0 | 0.8 | 12.9 | 12.1 |
| 5. PPI coil 706482: 21 uin Reflow Sn over 3 uin Ag over 3 uin Cu over 6 uin Ni | 0.14 | 0.13 | 0.8 | 0.8 | 33.6 | 13.2 |
| 6. PPI coil 706483: 44 uin Reflow Sn over 10 uin Ag over 3 uin Cu over 6 uin Ni | 0.14 | 0.14 | 0.8 | 0.7 | 7.6 | 8.3 |
| 7. PPI coil 706484: 44 uin Reflow Sn over 10 uin Ag over 10 uin Cu over 6 uin Ni | 0.14 | 0.17 | 1.1 | 0.7 | 3.2 | 2.0 |
| 8. PPI coil 706485: 86 uin Reflow Sn over 6 uin Ag over 15 uin Cu over 6 uin Ni | 0.37 | 0.40 | 0.8 | 0.8 | 0.8 | 0.7 |

While the presence of the $Ag_3Sn$ intermetallics in the tin layer contributes to reduced friction, the inventors have discovered that silver layers totaling 5-10 μin can yield sufficient $Ag_3Sn$ intermetallics to provide an advantageous reduction in friction (R/N) with reduced metals cost compared to other preferred embodiments of this disclosure. In particular these embodiments can achieve a friction (R/N) of 5. The copper alloy electrical connector component according to claim 4 wherein after reflow heating the coating gives the connector component an R/N of between about 0.19 and about 0.135.

6. The copper alloy electrical connector component according to claim 1 wherein there is a total of between about 5 μin and about 10 μin of one or more silver layers.

7. A copper alloy electrical connector component having a coating thereon formed by applying a nickel layer of between about 5 μin and about 20 μin over the copper alloy; applying a copper layer of between about 7 μin and about 18 μin over the nickel layer; applying a silver layer of between 5 μin and about 15 μin; and applying between about 40 μin and about 80 μin of tin; and reflow heating the coated copper alloy electrical connector component to cause mixing of the silver and tin layers and formation of a silver tin layer including between about 8 vol % and about 45 vol % of an Ag₃Sn intermetallic.

8. The copper alloy electrical connector component according to claim 7 wherein the coating gives the connector component an R/N of between about 0.20 and about 0.13.

9. The copper alloy electrical connector component according to claim 8 wherein after reflow heating the coating gives the connector component an R/N of between about 0.19 and about 0.135.

10. The copper alloy electrical connector component according to claim 7 wherein there is a total of between about 5 μin and about 10 μin of one or more silver layers applied before reflow heating.

11. A coating over a copper alloy electrical connector component, the coating formed by applying a nickel layer of between about 5 μin and about 20 μin over the copper alloy; applying a copper layer of between about 7 μin and about 18 μin over the nickel layer; applying a total of between 5 μin and about 15 μin silver layers and about 40 μin and about 80 μin of tin layers over the copper layer; and reflow heating the coated copper alloy electrical connector component to cause mixing of the silver and tin layers and formation of a silver tin layer including between 8 vol % and 45 vol % of an Ag₃Sn intermetallic.

12. The coating on a copper alloy electrical connector component according to claim 11 wherein the coating gives the connector component an R/N of between about 0.20 and about 0.13.

13. The coating on a copper alloy electrical connector component according to claim 12 wherein after reflow heating the coating gives the connector component an R/N of between about 0.19 and about 0.135.

14. The coating on a copper alloy electrical connector component according to claim 11 wherein there is a total of between about 5 μin and about 10 μin of one or more silver layers applied before reflow heating.

15. A method of forming a coating on a copper alloy electrical connector component, the method comprising:
applying a nickel layer of between about 5 μin and about 20 μin over the copper alloy; applying a copper layer of between about 7 μin and about 18 μin over the nickel layer; applying a total of between about 5 μin and about 15 μin of silver layers and about 40 μin and about 80 μin of tin layers over the copper layer; and reflow heating the coating to cause mixing of the silver and tin layers and formation of between 8 vol % and about 45 vol % of an Ag₃Sn intermetallic in the resulting silver tin layer.

16. The method according to claim 15 wherein the silver layers are applied as a single layer over the copper layer, and the tin layers are applied as a single layer over the silver layer.

17. The method according to claim 15 wherein the silver layers and the tin layers are applied as a plurality of alternating layers of silver and of tin.

18. The method according to claim 15 wherein the coating gives the connector component an R/N of between about 0.20 and about 0.13.

19. The method according to claim 18 wherein after reflow heating the coating gives the connector component an R/N of between about 0.19 and about 0.135.

20. The method according to claim 18 wherein there is a total of between about 5 μin and about 10 μin of one or more silver layers applied before reflow heating.

21. A copper alloy electrical connector component according to claim 7 wherein the silver layer is disposed between the copper layer and the tin.

22. A coating over a copper alloy electrical connector component according to claim 11, wherein at least one of said silver layers is disposed between the copper layer and one of the tin layers.

23. A coating over a copper alloy electrical connector component according to claim 11, wherein the layers of silver and the layers of tin are interleaved over the copper layer.

* * * * *